United States Patent [19]

Resnick

[11] 4,432,063

[45] Feb. 14, 1984

[54] APPARATUS FOR AUTOMATICALLY MOVING A ROBOT ARM ALONG A NONPROGRAMMED PATH

[75] Inventor: Brian J. Resnick, Cincinnati, Ohio

[73] Assignee: Cincinnati Milacron Inc., Cincinnati, Ohio

[21] Appl. No.: 308,983

[22] Filed: Oct. 6, 1981

[51] Int. Cl.³ .............................................. G06F 15/46
[52] U.S. Cl. ..................................... 364/513; 364/474; 364/475; 364/170; 364/175; 364/191; 364/192; 364/193; 318/568
[58] Field of Search ............... 364/513, 170, 175, 474, 364/192; 318/568

[56] References Cited

U.S. PATENT DOCUMENTS

| Re. 30,016 | 5/1979 | Hohn | 364/513 |
|---|---|---|---|
| 3,684,874 | 8/1972 | Kelling | 364/170 |
| 4,025,838 | 5/1977 | Watanabe | 364/513 |
| 4,096,770 | 6/1978 | Tanner | 364/474 |
| 4,140,953 | 2/1979 | Dunne | 364/513 |
| 4,166,543 | 9/1979 | Dahlstrom | 364/513 |
| 4,178,632 | 12/1979 | Anthony | 364/513 |
| 4,218,172 | 8/1980 | Freud | 364/513 |
| 4,287,459 | 9/1981 | Dahlstrom | 364/513 |
| 4,356,554 | 10/1982 | Susnjara et al. | 364/513 |
| 4,370,721 | 1/1983 | Berenberg et al. | 364/474 |

OTHER PUBLICATIONS

"A flexible robot arc welding system," Holmes, J. G., Resnick, B. J., Soc. of Manf. Engr. MS 79-790 (1979), pp. 1, 12, 13.

Primary Examiner—Mark E. Nusbaum
Assistant Examiner—John R. Lastova
Attorney, Agent, or Firm—John W. Gregg

[57] ABSTRACT

Apparatus for moving a robot arm through a series of nonprogrammed points defining a nonprogrammed path in response to coordinate data supplied by an external device. During the automatic execution of a programmed cycle of operation, a robot control causes the robot arm to move to a predetermined programmed position; and in response to a programmed external path control code, an external path control generator serially provides position data defining the nonprogrammed points. The robot control moves the robot arm through the nonprogrammed points, after which the programmed cycle of operation is continued.

6 Claims, 8 Drawing Figures

APPARATUS FOR AUTOMATICALLY MOVING A ROBOT ARM ALONG A NONPROGRAMMED PATH

BACKGROUND OF THE INVENTION

Typically, with program controlled robot arms, a program of functions and coordinate data defining desired positions and orientations is defined and stored during a teaching or programming mode of operation. During the automatic mode of operation, the stored program is executed; and the robot arm moves to the programmed positions. The motion between the programmed positions may be point-to-point or along a controlled path. With point-to-point motion, the path between the programmed points is generally unknown and irregular. With controlled path motion, the path of the robot arm between the programmed points is along a known predictable path defined by the robot control, e.g. a straight line path. In either case, the locus of the programmed points represents the overall programmed path of the robot arm.

In both of the above cases, the actual path of the robot arm is limited to motion between the positions defined by the program. This is satisfactory in situations where the desired path of the robot arm is predictable and does not change from cycle to cycle. This is also satisfactory in applications where the exact path is not critical to the successful operation of the robot arm, e.g., spot welding, paint spraying, etc. However, there are situations where the exact path is critical but not constant. Using a traditional robot arm and control, to guarantee that the desired path exactly corresponds to the programmed path may require expensive and complex fixturing or manufacturing tolerances and handling procedures which are unacceptable in today's manufacturing environment.

Consequently, the need exists to provide a robot arm and control that functions in an environment in which the desired path is not predictable, nor repeatable from one cycle of operation to another. Such an application may be seam welding where two rough cut parts are manually tack welded together. In these situations, the seam will change from one pair of parts to another, and an exact path cannot be programmed in advance. In other situations, the robot arm may be required to remove the flashing from rough castings which will vary significantly from workpiece to workpiece.

Therefore, one object of the invention is to provide a robot arm and control which automatically responds to externally generated sets of input signals representing nonprogrammed points having a locus defining a desired, but unpredictable, nonprogrammed path.

Another object of this invention is to provide a robot arm and control having more flexibility in the automatic mode of operation by providing the capability of moving along a nonprogrammed path.

A further object of the invention is to provide a robot arm and control which dynamically responds to externally generated information for moving the robot arm to a series of nonprogrammed points having a locus defining a nonprogrammed path.

A further object of the invention is to provide a robot arm and control with the capability of responding to a programmed function code during the automatic mode of operation and accepting sets of input signals from an external path generator which define a number of nonprogrammed points.

A still further object of the invention is to provide a robot arm and control which in response to a programmed function code interrupts its automatic mode of operation, accepts nonprogrammed position and process function data from an external path generator, moves to the nonprogrammed points, executes the process function and resumes the automatic mode of operation.

SUMMARY OF THE INVENTION

According to one embodiment of the invention, an apparatus is provided for moving a tool centerpoint of a function element to a series of programmed points having a locus defining a programmed path in response to input signals defining programmed tool centerpoint positions relative to a rectangular coordinate system. This apparatus is connected to an external path generator which is responsive to an external path control signal for causing the tool centerpoint to move to a number of nonprogrammed points defining a nonprogrammed path. The apparatus includes a machine having machine members connected to one end of the function element and actuators associated with the machine members for providing a plurality of axes of motion to move the tool centerpoint. The plurality of axes of motion and the machine members define a generalized coordinate system different from the rectangular coordinate system. The machine is coupled to a machine control which has a memory for storing programmed sets of input signals. A data communications interface is provided for exchanging sets of input signals between the path generator and the machine control, and a servomechanism circuit is connected to the actuators to control the position and motion of the tool centerpoint. The machine control executes a first step of recalling a first set of input signals from the memory. Next, the input signals are tested for the presence of an external path control signal. If an external path control signal exists, an external path generation cycle is executed by first conditioning the data communications interface to establish an active link between the external path generator and the machine control. Second, the machine control receives from the external path control a new set of input signals representing a nonprogrammed position of the tool centerpoint relative to a rectangular coordinate system. Third, the new set of input signals are transformed to drive signals representing generalized coordinate values of the nonprogrammed position. Fourth, the actuators on the machine are energized to move the tool centerpoint to the nonprogrammed position. Fifth, further sets of new input signals are received representing further nonprogrammed positions; and the actuators move the tool centerpoint to each successive position; thereby causing the tool centerpoint to move along a nonprogrammed path.

DESCRIPTION OF THE PREFERRED EMBODIMENT

Figure 1:
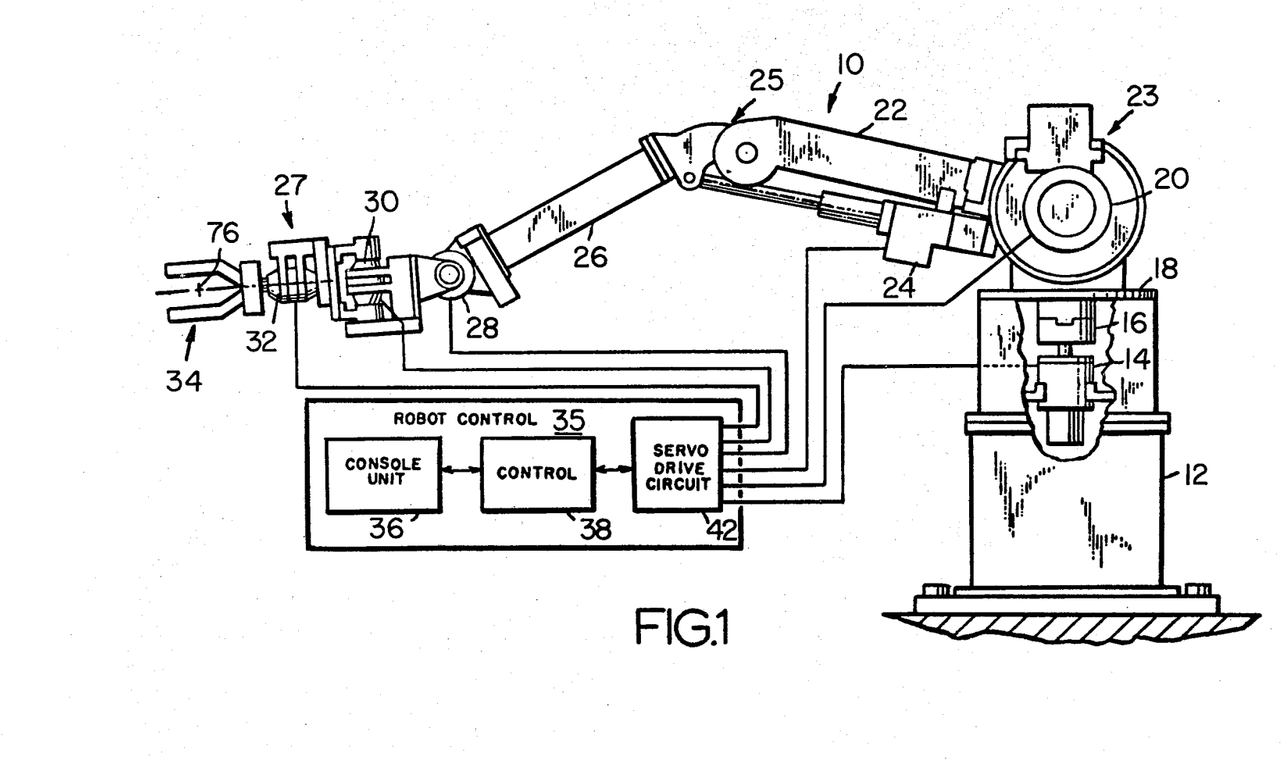
FIG. 1 is an overall view of a robot arm and further illustrates a block diagram of a robot control.

FIG. 1 is an illustration of a commercially available robot arm, and FIG. 1 further includes a general block diagram of a robot control. As used herein, the term robot arm encompasses any machine which may be subject to the claimed invention.

The illustrated robot arm 10 is comprised exclusively of axes of rotary motion. The base 12 contains an actuator 14 which is connected by means of a coupling 16 to a rotatably mounted plate 18. It should be noted that the exact nature of the actuator 14 is not significant to the disclosure. Prior art actuators and control methods, whether the actuator is electric, hydraulic, pneumatic, etc. are applicable. Rigidly affixed to the plate 18 is an actuator 20 providing a second axis of rotation. An upper robot arm member 22 is attached to a working member of the actuator 20. Affixed to the upper arm 22 is an actuator 24 which provides a rotation of the lower robot arm member 26 about the upper arm member 22. The first plurality of actuators 14, 20 and 24 provide a first plurality of axes of motion to move the end of the robot arm to any point in space within its range. A wrist 27 is comprised of rotary actuators 28, 30 and 32 and is connected to a function element 34 for moving the function element between successive angular positions. The second plurality of actuators 28, 30 and 32 provide a second plurality of rotational axes of motion which are effective to move the function element through changes in angular orientation.

The position of the end of the robot arm is measured relative to the location of a workpoint or tool centerpoint associated with the tooling defining the function element. For example, the tool centerpoint may be the point at which gripping tongs come together, e.g., point 76, the centerline at the end of a cutting tool, the point at which spot welding heads come together, the center of the spray fan from a spray gun, the focal point of an optical head for a vision sensor, etc. It should be noted that the function element 34 may have an actuator (not shown) for generating the desired function, e.g. a gripping action. The physical configuration of the above machine provides a plurality of axes of rotary motion which when considered with the machine members define a generalized coordinate system.

Within a robot control 35, a console unit 36 provides an operator's communication link to the robot arm. The console includes controls for programming or teaching the robot arm a cycle of operation and input devices for generating input signals to enable the predetermined cycle of operation. A control 38 utilizes programs and input signals to produce drive signals to a servomechanism drive circuit 42 which commands the actuators on the robot arm to move the tool centerpoint between the programmed points and to rotate the function element through angular changes of orientation.

A robot arm and control as described corresponds to the T³ industrial robot and control commercially available from Cincinnati Milacron Inc. Further, the detailed operation of the robot arm in its automatic mode of control is described in U.S. Pat. No. 3,909,600, and a description of the method and apparatus utilized for teaching the robot arm a program is described in U.S. Pat. No. 3,920,972.

Figure 2:
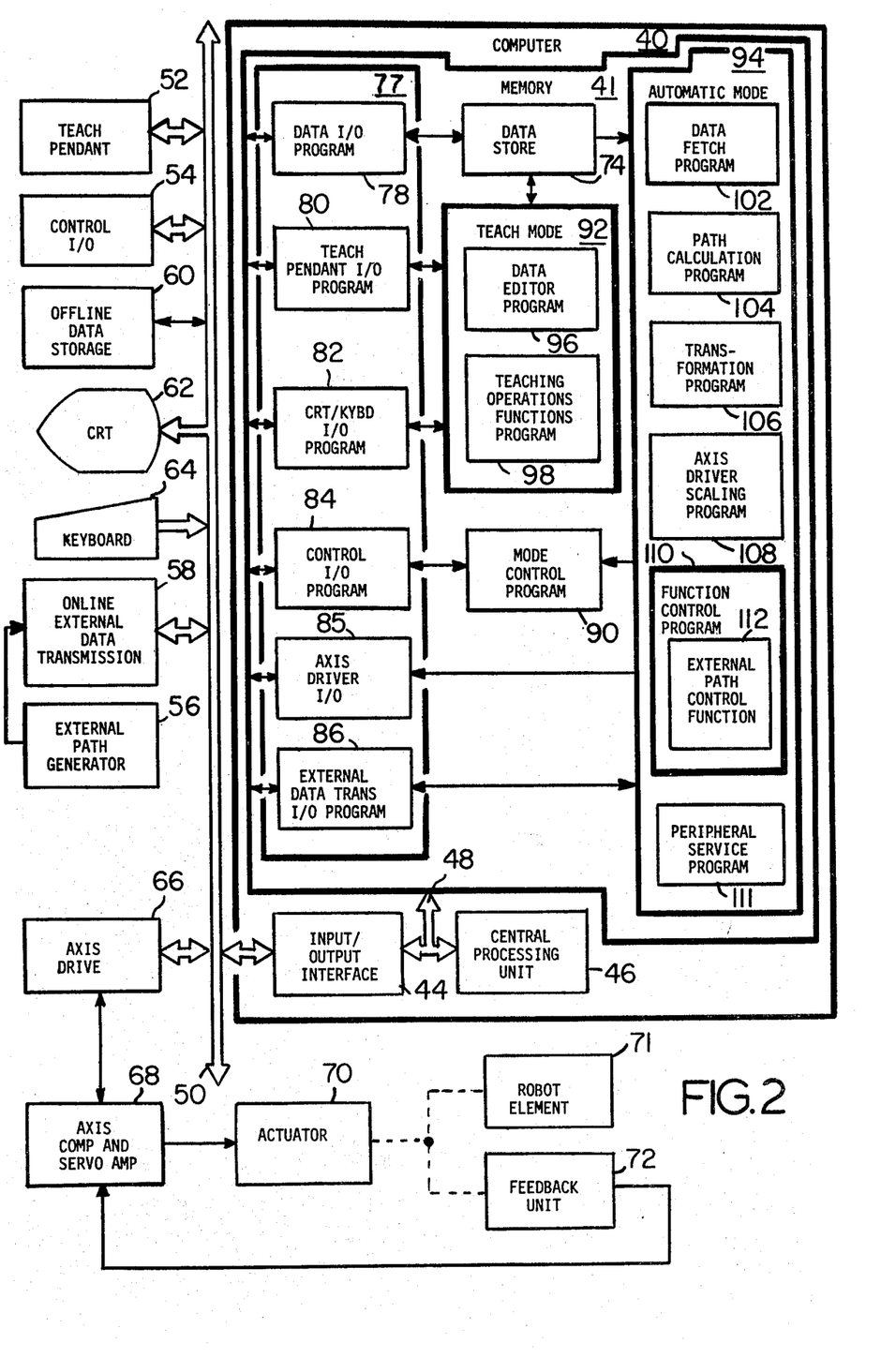
FIG. 2 is a detailed block diagram of a computer based robot control for the robot arm.

FIG. 2 is a detailed block diagram illustrating the basic components of the commercially available robot control reference above. A programmed computer 40 is comprised of a memory circuit 41, input/output interface circuit 44 and a central processing unit 46. These three main elements are interconnected by an internal bus 48. Control signals are passed to and from the computer 40 by means of an external bus 50 which is connected to a number of peripheral devices. First, a teach pendant 52 is a remote programming tool utilized by the operator to move the end of the robot arm to a number of desired positions and orientations during the teaching process. Next, control I/O 54 defines a number of miscellaneous machine signals which are necessary for the operation of the robot arm. The external data transmission I/O block 58 represents a device which allows data to be entered into the computer 40 from an external data store on a real time basis, i.e., while the robot arm is executing a cycle of operation. An off-line data storage unit 60 is provided for allowing programs to be input to the computer by means of such devices as a punched tape reader, a cassette reader etc. The CRT 62 and keyboard 64 provide means by which the robot arm and its control are able to communicate messages to and from the operator.

The axis drive unit 66 accepts blocks of data from the computer on a periodic basis. Each block of data represents the incremental magnitudes of motion of the robot arm actuators during each periodic interval. Further, the magnitude of motion over each fixed period inherently provides a definition of the desired velocity of the robot arm. The axis drive 66 accepts the data in digital form and executes a digital-to-analogue conversion thereby providing an analogue signal to the axis compensation and servoamplifier 68. The compensated analogue signals are then used as an input to an actuator 70 which drives the robot element 71 mechanically attached thereto. Feedback device 72 is mechanically connected to the actuator and provides a feedback signal representing the actual motion of the driven element of the robot arm. It should be noted that although there are several configurations for control of the servomechanism loop for each element of the robot arm in the preferred embodiment, the axis drive 66, servoamplifier 68, actuator 70 and feedback element 72 are utilized in numbers equal to the number of controlled axes on the robot arm.

The memory 41 within the computer 40 is comprised of two basic components. The first being the data store 74 which stores all of numerical data information, and the remainder of the memory is defined as the operating system of the robot arm. The operating system may be characterized as a control program which defines how data is to be generated and utilized during the operation of the robot arm.

The first section of the operating system is an I/O section, 77. The I/O programs include a data I/O program 78, a teach pendant I/O program 80, a CRT and keyboard I/O program 82, a control I/O program 84, an axis driver I/O program 85 and an external data transmission I/O program 86. It will be noted that there is an I/O program corresponding to each different type of peripheral being interfaced into the control system. Each I/O program is uniquely responsive to the data produced by each peripheral device and is effective to control the flow of signals from the peripheral devices into and out of the computer.

The operating system also contains a mode control program 90 which exercises overall control over the operating system. The mode control program 90 switches control of the computer between the various operating modes, e.g., manual, teach, automatic, etc. Within the teach mode system 92, the data editor program 96 and a teach program 98 control the operation of the robot arm during the teach mode. The specifics of these program are described in U.S. Pat. No. 3,920,972. During the teach mode, the position and orientation of the function element required to execute a cycle of operation are defined. Using a teach control, the function element is moved along axes of motion defining a rectangular, cylindrical or other nongeneralized coordinate system. When a desired position and orientation is achieved, a set of input signals representing rectangular coordinate values of the desired position and orientation is stored in the data store 74 of the memory 41. The set of input signals may further include a function code which represents a particular operation or function to be executed at the desired location, e.g., the operation of the tool, testing of an internal or external signal state, etc. By iterating the above process, a series of sets of input signals defining a complete cycle of operation may be programmed.

The automatic mode system 94 is comprised of a data fetch program 102, a path calculation program 104, a transformation program 106, an axis driver program 108, a function control program 110 and a peripheral service program 111. Details of these programs are specifically described in U.S. Pat. No. 3,909,600. The automatic mode causes the function element to move between the programmed positions. This motion may be point-to-point or may be along predetermined paths, e.g., straight line paths. In the preferred embodiment, the programmed path is defined by a series of intersecting straight line paths, wherein the programmed tool centerpoint positions represent the points of insection of the straight line paths and the locus of the programmed positions defines the programmed path.

Figure 4:
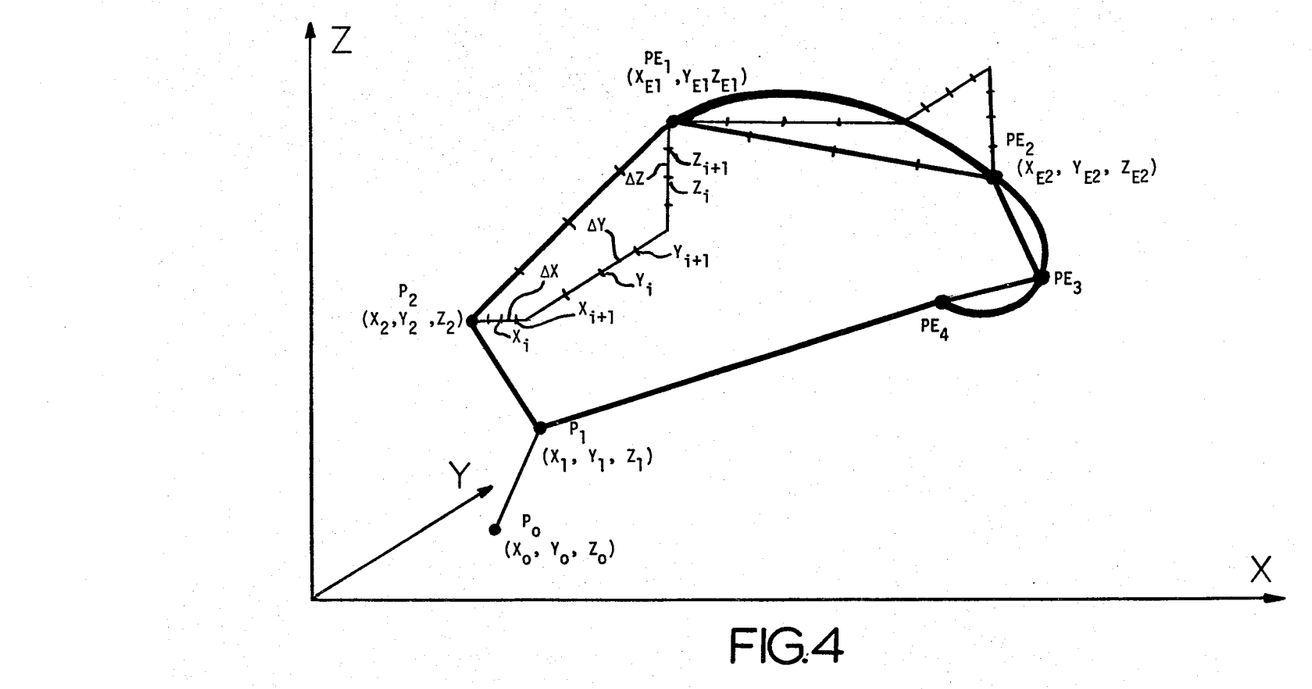
FIG. 4 is an illustration of tool centerpoint motion using the claimed invention.

In utilizing the claimed invention, a program is taught as described above up to the point from which the nonprogrammed path is to be approached. Referring to FIG. 4, point $P_0$ may be a home or starting position. Using the teach controls, the tool centerpoint of the robot arm is moved to points $P_1$ and $P_2$; and at each point, the rectangular coordinate values defining the position and orientation of the points and an associated function code, if required, are stored. The curvature between points $PE_1$ and $PE_4$ represents a nonprogrammed path which may be different with each cycle of operation. For ease of understanding FIG. 4, only the X,Y,Z rectangular coordinate values defining positions of the robot arm are illustrated. Although not illustrated in FIG. 4, in the preferred embodiment, coordinate values defining the orientation of the robot arm are associated with each position. While one to three axes of orientation may be used, in this specification, two axes of orientation, m and n, defining pitch and yaw, respectively, are considered to be part of the definition of each of the points in FIG. 4.

To initiate a path generation cycle, an external path control function code is programmed and stored as an input signal in association with the programmed input signals defining the position and orientation of the point $P_2$. When the stored program is executed, the automatic mode program 94 of FIG. 2 will cause the function element to move through the programmed positions and orientations and stop motion at the point $P_2$. At this point, the external path control signal will initiate an external path generation cycle defined by the external path control function program 112 within the function control program 110. The program 112 initiates communication with an external path generator 56 by activiating a data communications interface comprised of the external data transmission I/O program 86, the external bus 50 and the on-line external data transmission interface 58. The data communications interface serially transmits messages composed of sixteen 8-bit bytes to and from the robot control. The external path generator includes a sensor which may be visual, tactile or any other device for sensing the position and orientation of points having a locus defining the nonprogrammed path. The definition and operation of the sensor will depend on the particular application of the robot arm. However, its ultimate purpose in all applications is to scan the nonprogrammed path and provide new sets of input signals to the robot control representing rectangular coordinate values of the position and orientation of points on the nonprogrammed path. The external path generator of the preferred embodiment operates relative to a rectangular coordinate system, however, other nongeneralized coordinate systems may be used. The new sets of input signals are received by the external path control function program 112 which transforms the rectangular coordinate values into corresponding new generalized coordinate values. The differences between the new generalized coordinate values and the current generalized coordinate values are calculated and stored as drive signals in a buffer store to await an interrupt from the servomechanism circuit. The servomechanism circuit utilizes the changes in the generalized coordinate values to cause the actuators on the robot arm to move the function element to the nonprogrammed positions and orientations defined by the new sets of input signals thereby causing the robot arm to follow the nonprogrammed path defined by the external path generator.

Therefore, the invention provides the user of the robot arm with the capability of allowing the robot arm to follow a nonprogrammed path on a real time basis during the automatic mode of operation. The actual manifestation of the elements of the external path generator by which it scans the nonprogrammed path and generates new sets of input signal representing rectangular coordinate values of points on that path is not important to the claimed invention. The definition, configuration and combinations of elements required to produce this capability will depend on the sophistication, budget and experience of the user as well as the parameters and variables surrounding the application or process being implemented. The claimed invention requires the existence of an external path generator capable of transmitting a set of input signals representing coordinate data relative to a nongeneralized coordinate system which can be received by the robot control. This requirement may be satisfied by a wide range of currently available technologies.

Figure 3:
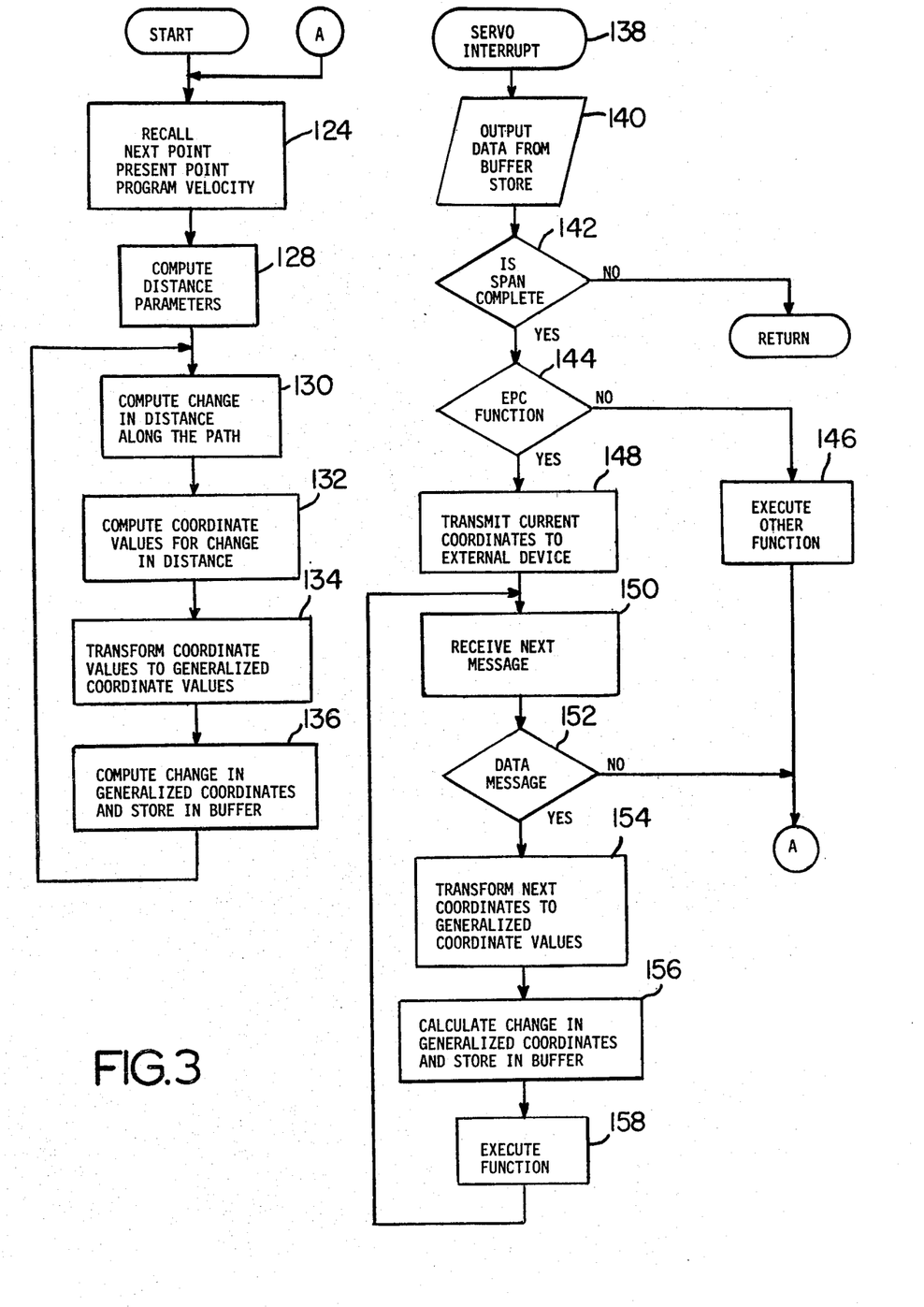
FIG. 3 is a detailed flow chart illustrating the process steps for executing a cycle of operation under the automatic mode of operation.

FIG. 3 illustrates a flow chart of the preferred embodiment defining the process steps for executing an automatic mode of operation which includes an external path generation cycle. The process for moving the function element from a present programmed point to the next programmed point is not important to the claimed invention. There are many such processes disclosed in the prior art, e.g. motion on a point-to-point basis, time coordinated motion or motion along a predetermined path. The flow chart of FIG. 3 describes the general process steps of the preferred embodiment which executes motion along a predetermined path. The details of this process are disclosed specifically in U.S. Pat. No. 3,909,600, wherein the predetermined path is chosen to be a straight line.

In process step 124, the rectangular coordinate values of the present point, the next point and the program velocity are called from the program store. In process step 128, distance parameters are computed which enable the definition of a straight line path between the present point and the next point. Typical parameters to be computed are the linear distance between the present point and the next point, the number of iterations which will be required to move on an incremental basis along the straight line path and the rectangular coordinate axis components of the total path. Given this information, process step 130 requires that the change in distance along the predetermined path between the present point and the next point during a single iteration be computed. Process step 132 calculates the rectangular coordinate values of an end point of the first incremental displacement along the straight line path beginning from the present point. Process step 134 transforms the rectangular coordinate values of that end point into corresponding generalized coordinate values relative to the generalized coordinate system defined by the geometry of the robot arm. Process step 136 computes the change in the generalized coordinate values and stores this set of differentials as a set of drive signals in the buffer store to await an interrupt from the servomechanism drive circuit 42. A number of sets of differentials may be queued in the buffer store at one time.

The above process operates asynchronously from the servomechanism drive circuit 42. The circuit 42 operates on a fixed time base sampling system. In other words, at fixed predetermined intervals of time, the servomechanism requests new information from the computer. By operating the servomechanism at a fixed sampling rate, the computer is provided with several advantages. For example, by knowing the length of the programmed path, the predetermined path velocity and the fixed length of a sample time, the computer is able in process step 128 to compute the number of iterations required to execute the predetermined path. Consequently, with this information, the computer then can calculate the change in distance along the predetermined path with each iteration. Further, as will be appreciated by those who are skilled in the art, the use of a fixed time sampling rate permits the computer to execute other functions in addition to generating the predetermined path. Because the computer is substantially faster than the peripheral devices attached to it, a backlog of information to be output therefrom is generated. Consequently, a system of interrupts each having a particular priority is used.

The purpose of the servointerrupt routine defined in process block 138 is to transfer data from the buffer store in response to an interrupt from the servomechanism drive circuit 42. The interrupt may occur at any time during the process. When the interrupt does occur, control of the process is transferred from the main program to the servointerrupt routine 138. Within the servointerrupt routine 138, process step 140 transfers one of the queued sets of differential generalized coordinate values from the buffer store to the servomechanism drive circuit 42. This circuit converts this data into analog signals which cause the actuators on the machine to move through a change in position defining the corresponding differential generalized coordinate value. At the end of this change in position of the actuators, the function element of the robot arm should have a position and orientation corresponding to the end point of the first incremental change in displacement along the path defined by the coordinate values calculated in process step 132. Next, decision step 142 tests to determine whether the path between the present point and the next point is complete. Since the above process has only described motion through a first incremental change along the path, the predetermined path is not complete; and the servointerrupt routine returns control of the process back to the main program at the point where the interrupt occurred. Successive incremental displacements along the predetermined path are defined and changes in generalized coordinates corresponding to those incremental changes are determined and stored. With each successive servointerrupt, the function element is moved along the straight line path until the next point is reached. At this point, test 142 detects completion of the predetermined path; and the process moves to step 144 which tests whether the function code associated with the next point represents an external path control function. If not, process step 146 executes whatever other function has been programmed; and thereafter, beginning with step 124, the path generation process is repeated. The description of FIG. 3 thus far is described in detail in U.S. Pat. No. 3,909,600 and represents the execution of the standard automatic mode of operation for moving the function element between points $P_0$ and $P_1$ in FIG. 4.

In moving the function element from points $P_1$ and $P_2$ and knowing that after point $P_2$, an external path generation cycle is required, an external path control function code is programmed in association with the rectangular coordinate data defining the position and orientation of the point $P_2$. The process steps 124 through 142 of FIG. 3 are executed as previously described, and the function element is moved to the programmed point $P_2$. At this time, the process step 144 detects the presence of the external path control function, and an external path generation cycle is initiated. The first step in the cycle is to condition the data communications interface to establish an active data link for exchanging sets of input signals between the robot control and the external path generator. In the preferred embodiment, process step 148 transfers a first set of input signals to the external path generator which represent the absolute rectangular coordinate values defining the position and orientation of the present point. In the example described in FIG. 4, the present point would be the point $P_2$. Thereafter, the external path generator defines the rectangular coordinate values of the first point $PE_1$ on the nonprogrammed path and transmits a message representing the coordinate values of this point to the robot control as a new set of input signals via the data communications interface. Process step 150 receives the message from the external path generator, and process step 152 tests whether the message is a data message which it is.

In FIG. 5, two embodiments will be described for moving the function element from point $P_2$ to point $PE_1$. Whichever embodiment is practiced, process step 154 transforms rectangular coordinate values of the next nonprogrammed point to corresponding generalized coordinate values. Process step 156 calculates the change in generalized coordinate values and stores the differential in a buffer store to await a servointerrupt as previously described. If the data message includes a function code, process step 158 will cause the function to be executed after the function element has reached the point $PE_1$. The process then returns to process step 150 to receive the next message from the external path generator which will describe the absolute rectangular coordinate values of the position and orientation relative to the point $PE_2$. The process in steps 150 through 158 is repeated until the function element has been moved to the point $PE_4$. The next message received from the external path generator will not be a data message; and therefore process step 152 interprets the message as the end of the external path control function, thereby terminating the external path generation cycle. The process then returns to process step 124 to recall the next programmed point which according to the example of FIG. 4 would be the point $P_1$. By executing the process of blocks 124 through 142, the function element moves from the point $PE_4$ to the point $P_1$ which completes a cycle of operation and places the robot arm in a position to begin the next cycle.

FIGS. 5a through 5d represent a detailed flow chart of an external path generation cycle described in FIG. 3. After the presence of an external path control signal is detected, the external path generation cycle is initiated by process step 160 which clears the internal flags within the program and resets a receive character pointer to zero. Process step 162 then sets a receive flag, clears the present function store to no function and moves the set of input signals representing the rectangular coordinate values of the current position and orientation of the function element to a present coordinate store. Process step 164 transmits the set of input signals defining the current position and orientation to the external path generator. Process step 166 tests for the presence of an error or an interrupt which, at this time, should not exist. Process step 168 executes the function defined by the present function store which was previously set to no function, and therefore, no action occurs. Process step 170 tests the state of the good data flat. However, this flag was previously cleared, and the process moves to step 172 which sets a start up flag, clears the present function store to no function and sets an internal iteration counter to its maximum value. Further, it sets the values of all $\Delta$ increments to zero. From this point, the process moves to step 176 in FIG. 5c.

As previously described, after the robot control transmits the rectangular coordinate values of the current position and orientation to the external path generator, the next step is to await transmission of a message representing a new set of input signals from the external path generator. The new set of input signals defines rectangular coordinate values representing the first nonprogrammed point, $PE_1$ and a process function code that the external path generator may define. The message is composed of 16 bytes of information which are transmitted to the robot control one byte at a time. Referring to FIG. 5c, the process moves through steps 176 through 184 with no action. Process step 186 tests the state of the receive flag. Since the receive flag was set by step 162, process step 188 tests whether a byte of information exists in the receive buffer. If it does not, the process iterates through the loop of steps 176 through 188 until the external path generator sends the first byte of information. When the information is in the receive buffer, the process moves to step 190 in FIG. 5d. Process step 190 transfers the byte in the receive buffer to a location in a next coordinate store which is pointed to by the receive character pointer. In this situation, the first byte would be transferred to the first location in the next coordinate store. Further, process step 190 increments the receive character pointer and further calculates the check sum value. Process step 192 tests whether the byte is the first byte. Since it is, process step 194 determines whether the message is a data message. The external path generator can cancel the external path generation cycle by transmitting a nondata message at any time. However, since this is a data message, process step 196 sends an acknowledge byte back to the external path generator; and the process returns to process step 176.

By iterating through the loop comprised of process steps 176 through 198, and step 196, the next 14 bytes of the data message are transferred from the external path generator to the robot control and loaded in the next coordinate store of the robot control. On the sixteenth byte of the message, process step 198 of FIG. 5d will detect that the last byte is being received and process step 200 will test the validity of the check sum value. The check sum value is a standard test which determines the general validity of the format of the message being transferred. If the check sum fails, process step 202 will zero the receive character pointer, clear the check sum value, and send a not-acknowledge byte to the external path generator. This information signals the external path generator that the message was not correctly received and that it is to retransmit the entire message. Therefore, the process turns to process step 176 to await a retransmission of the whole message. If the check sum is valid, process step 204 will clear the receive flag, set the good data flag and send an acknowledge byte to the external path generator. Process step 206 tests whether the start-up flag is set. Since this flag was previously set in process step 172, process step 208 clears the start-up flag and directs the process to step 166 of FIG. 5a. At this time, there should be no error or interrupt input. Further, since the current message is located in the next coordinate store, whatever functional information is contained in that message, is not in the present function store; and consequently, the robot control does not detect the requirement to execute a present function. Therefore, the process moves directly to process step 170 to test the state of the good data flag. The good data flag was set by process step 204, and process step 174 tests the state of the cancel flag. Since the message is a data message, the cancel flag is not set; and the process moves to step 210 of FIG. 5b.

To briefly review with reference to FIG. 4, given the execution of the program previously described, the function element is located at the point $P_2$ which is a programmed point; and the programmed external path control function has initiated an external path control cycle. At this point, in the external path control cycle, the robot control has transferred to the external path generator the rectangular coordinate values of the current point, $P_2$, and the external path generator has transferred back to the robot control the new set of input signals defining the nonprogrammed point $PE_1$. The rectangular coordinate values of the point are located in the next coordinate store. It is now required to move the function element from the position and orientation of its current location, $P_2$, to the position and orientation defined by the coordinate values of the point PE$_1$. As will be appreciated by those who are skilled in the art, several techniques may be used to move the robot arm to the new point PE$_1$. Two particular embodiments will be discussed in this disclosure, and the claimed invention should not be limited by the technique utilized for moving a machine element from one point to another. The particular technique chosen will depend primarily on the type of external path generator used, the capability of the data communications link between the external path generator and the robot control and the rate at which the robot control itself can accept and process data. Further, the normal design parameters of cost and reliability will affect the choice of a path control technique.

If current state of the art computer process and data transmission techniques are utilized, the coordinate values transmitted by the external path generator are processed by the robot control and motion to the next point is initiated immediately. However, in many situations, because of the scanning rate capabilities of the external path generator or the data transmission rate limitations between the external path generator and the robot control, the next point may be separated from the current point to the extent that a number of intermediate points are desirable in order to more precisely control the position and orientation of the function element in its motion between the current point and the next point. This latter embodiment will be described first.

One method of obtaining intermediate points between the present point and the next point is to utilize the existing path generation programs contained within the robot control which are described in process steps 124 through 136 of FIG. 3. However, as previously described, that process recites a technique for controlling the position and orientation of the function element precisely along a predetermined path at a selectable predetermined velocity. This is a very complex and time consuming process to execute.

In the case of the external path control function, a simpler process may be acceptable. For example, in moving from the current point to the next point, the velocity may be assumed to be a constant. Further, assume that the execution of the path between points P$_2$ and PE$_1$ will occur over some predetermined number of iterations which corresponds to the maximum count established in an iteration counter required by process step 172. Given this information, an incremental displacement along each coordinate axis with each iteration may be readily determined. Therefore, upon detecting that the good data flag is set but the cancel flag is not set, an iterative motion cycle is initiated by moving to process step 210. In this step, the Δ X referred to in FIG. 4 is defined by determining the difference between the next X coordinate value and the current X coordinate value and dividing that difference by the predetermined number of iterations, i.e. the maximum count. Process step 212 tests whether the Δ X is greater than a maximum X limit. Process steps 228 through 240 calculate the Δ values for each of the other rectangular coordinate axes defining position and orientation.

Thereafter, the process moves to process step 234 of FIG. 5c. This process step first moves the rectangular coordinate values of the next point from the next coordinate store to the present coordinate store. Next, the function associated with the next point is moved from the next coordinate store to the present function store and the receive character pointer is zeroed to be ready to accept the next message. Further, the good data flag is cleared, and the receive flag is set. Process step 176 then tests to determine whether the iteration count is zero. Since no iterations have begun, it is still at its maximum count. Process step 178 defines an intermediate point signal representing the rectangular coordinate values for a first intermediate point to which the function element is to move during the first iteration. This is simply accomplished by adding the previously determined Δ values for the rectangular coordinate axes to corresponding rectangular coordinate values of the current position of the function element. Referring to FIG. 4, $X_{i+1}$, $Y_{i+1}$, and $Z_{i+1}$ generally represent the rectangular coordinate values of the next intermediate point during one of the iterations. The values $X_i$, $Y_i$, and $Z_i$ represent the rectangular coordinate values of the current position of the function element at the beginning of any particular iteration. After calculating the rectangular coordinate values of the intermediate point for the first iteration along the path, process step 180 transforms those rectangular coordinate values to corresponding generalized coordinate values. Process step 182 computes the change in generalized coordinate values and stores in the buffer store a set of drive signals representing the change of position of each robot arm actuator which is required to move the function element to the intermediate point. Thereafter, the process operates as previously described. As each servointerrupt occurs, a set of drive signals is transferred to the servomechanism circuit; and the actuators for the robot arm move the function element to the intermediate point. Process step 184 decrements the iteration counter, and process step 186 tests the state of the receive flag. Since it was set in process step 232, process step 188 tests whether a byte is in the receive buffer. If there is no byte in the receive buffer, the process moves back to step 176. Since the iteration count in not zero, process step 178 computes a new set of rectangular coordinate values defining a second intermediate point which is associated with the second iteration. With each successive iteration of process steps 176 through 188, the function element is caused to move to an incrementally new position separated from its past position by a vector increment defined by the Δ coordinate values calculated in the steps of FIG. 5b. This iterative motion cycle continues until the iteration counter has been decremented to a zero value which is detected by process step 176. At this point, the function element is located at the position and orientation of the coordinates defining the first nonprogrammed point PE$_1$.

Figure 5A:
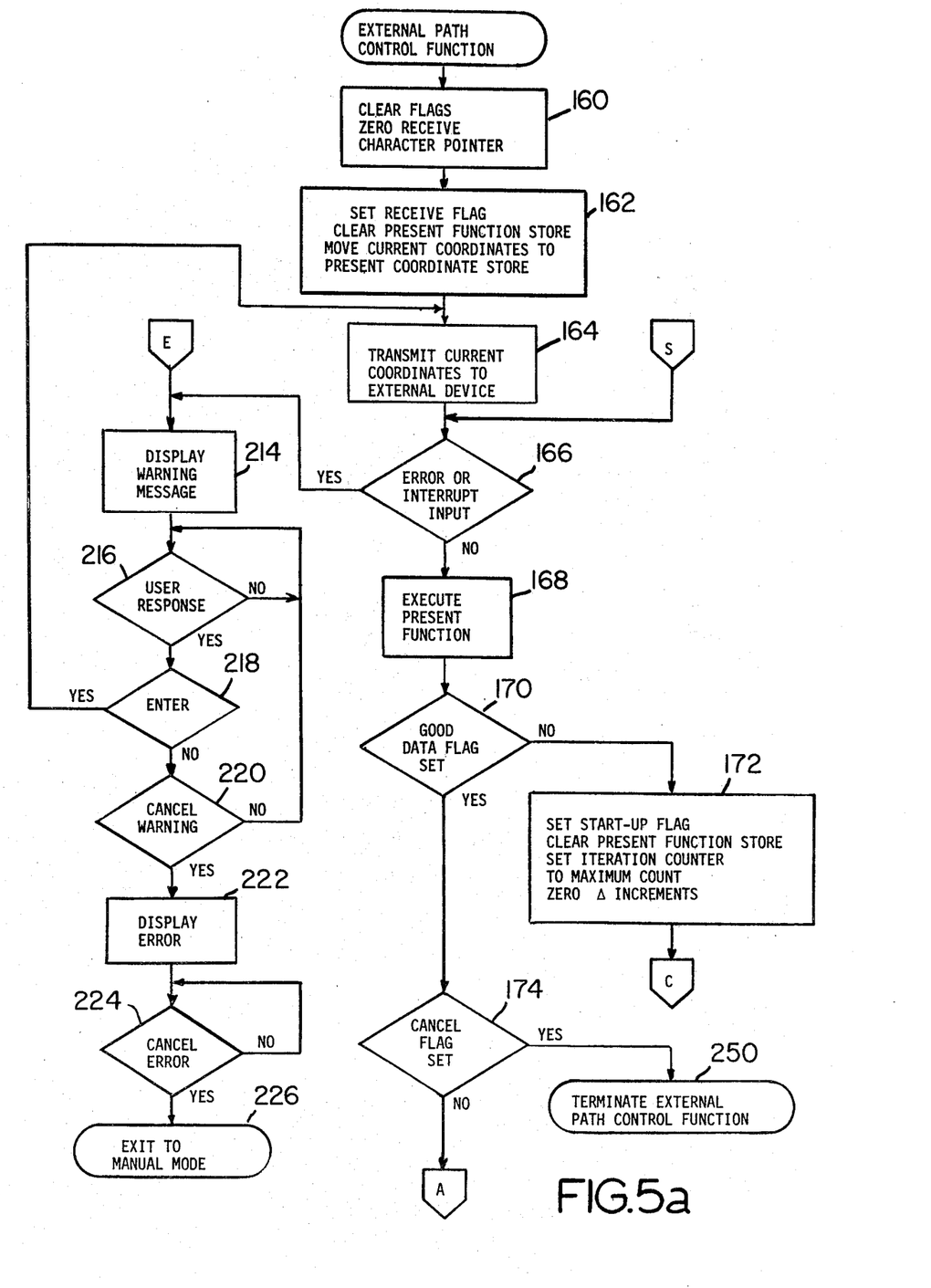
FIGS. 5a through 5d are detailed flow chart illustrating the process steps for moving the tool centerpoint along a nonprogrammed path in response to an external path control signal.

The process moves to process step 166 of FIG. 5a and directly to step 168. Since process step 234 moved the next function to the present function store, process step 168 will execute whatever function is contained in the present function store. At this point, the robot control has completed all of the operations required by the first data message received from the external path generator. As will be appreciated by those who are skilled in the art, while the successive coordinate values in process steps 178 through 184 are being calculated, process step 188 may determine that another byte is in the receive buffer indicating that the external path control is transmitting another message to the robot control. In this situation, process steps 190 through 208 of FIG. 5d will accept the new message and store it in the next coordinate store until the function element has moved to the point defined by the contents of the present coordinate store. While a message is resident in the next coordinate store, process step 188 will not recognize any further bytes in the receive buffer.

Figure 5B:
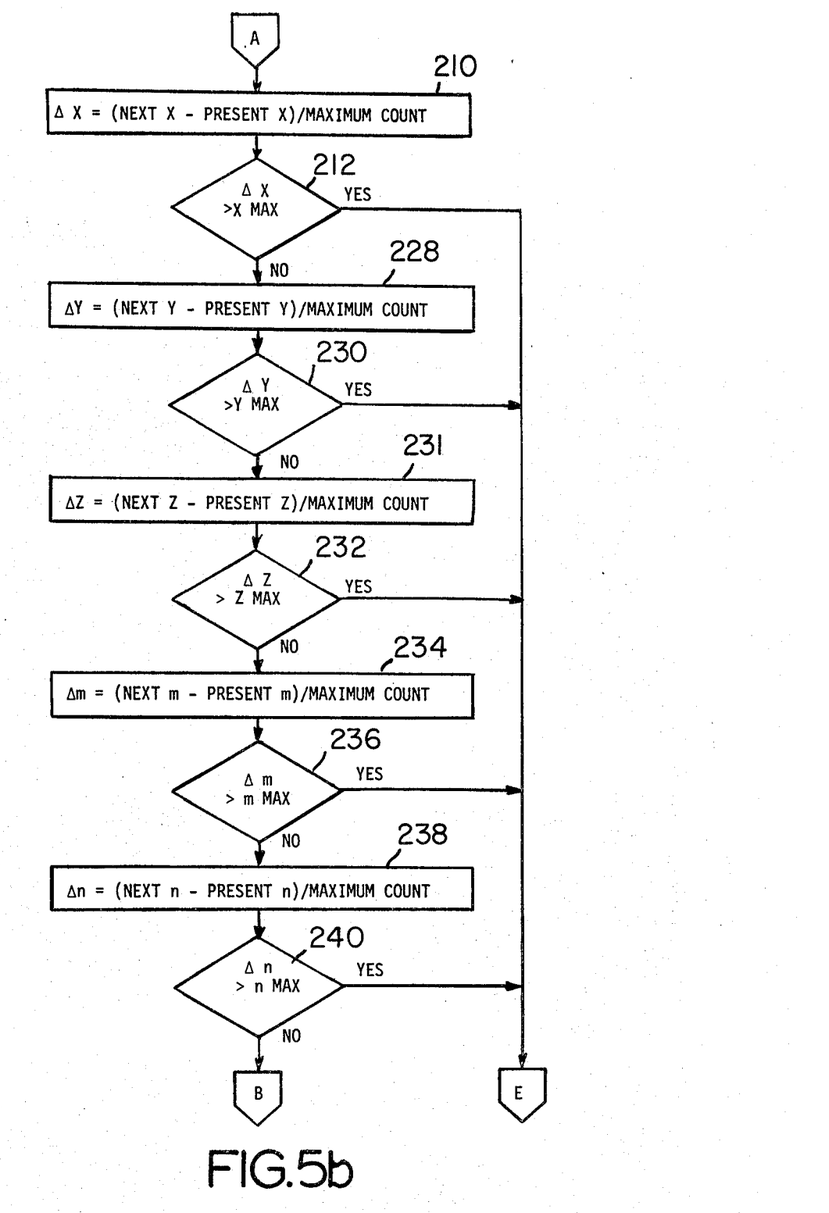
Figure 5C:
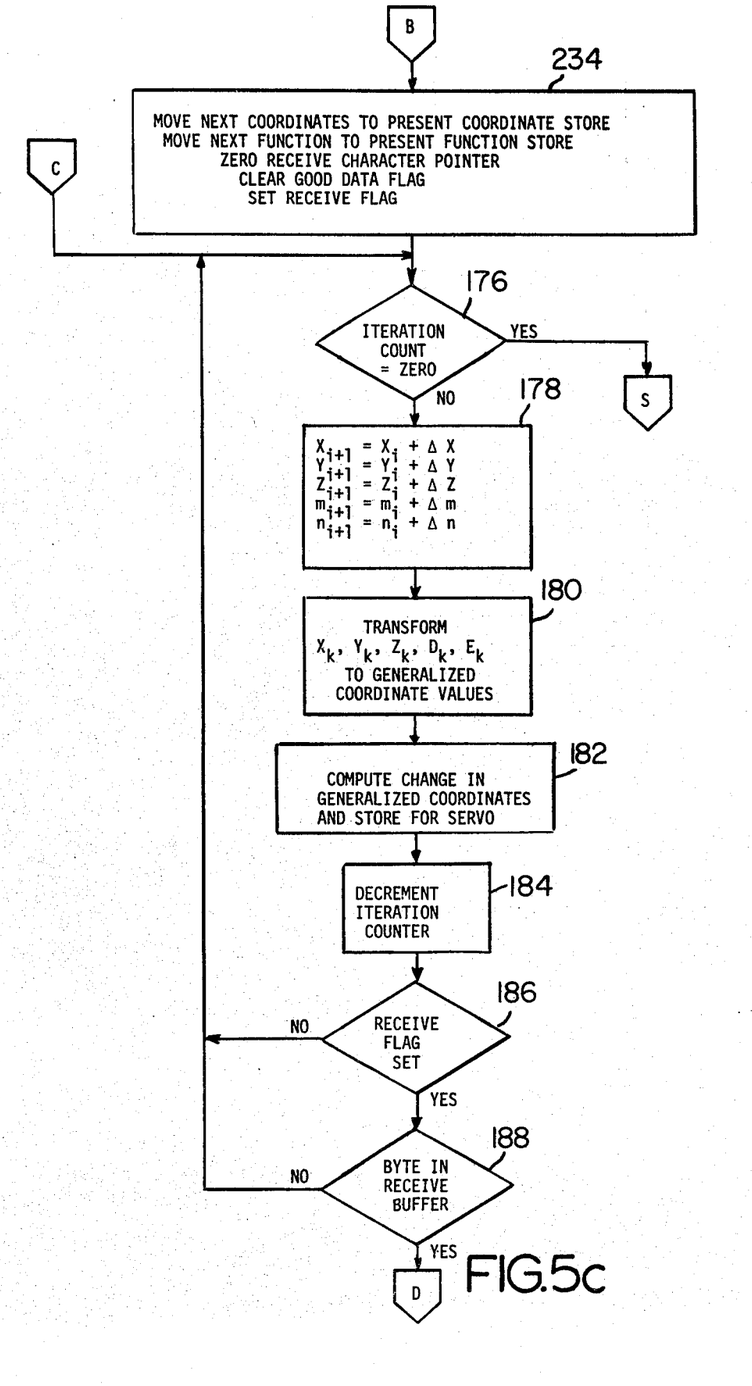
Figure 5D:
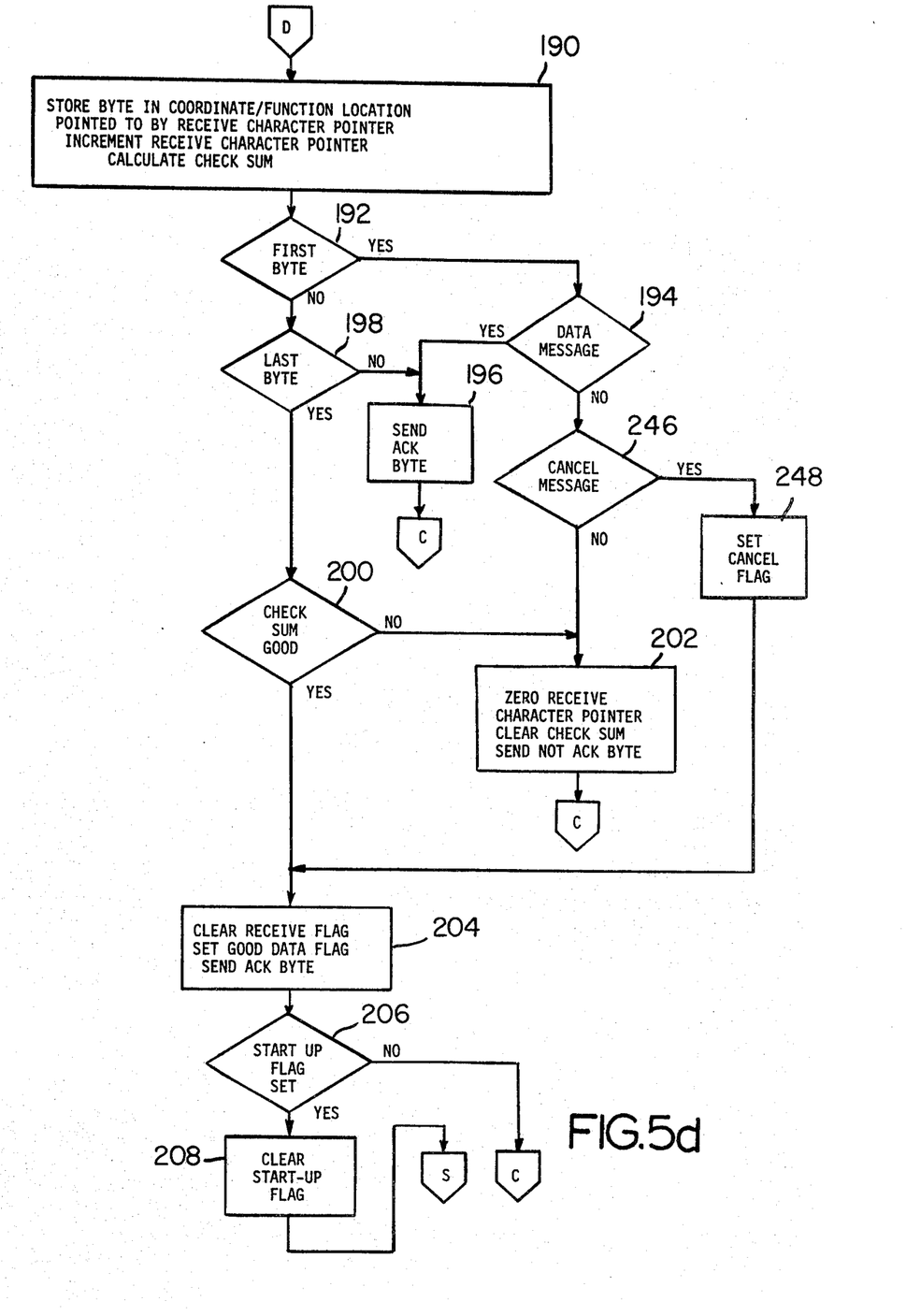

If at any time during the process, an error arises from process steps 212, 230, 232, 236 or 240 of FIG. 5b or from an interrupt input as tested for in process step 166 of FIG. 5a, process step 214 will display a warning message to the operator. Process step 216 awaits an operator response. If process step 218 detects that the operator has depressed the enter key, the process moves to step 164 and begins again. If the operator depresses the cancel key which is detected by a process step 220, process step 222 will display an error message as opposed to the warning message displayed in process step 214. If the operator again depresses the cancel key thereby attempting to clear the error, process step 224 will cause the robot control to exit the automatic mode of operation and move to the manual mode of operation.

If the second message transmitted by the external path generator is coordinate data and function information defining the desired position and orientation of the function element at the point PE$_2$ illustrated in FIG. 4, the process previously described will be repeated. The steps in FIG. 5b will calculate new Δ values, and the process of FIG. 5c will create a series of intermediate coordinate values defining positions and orientations of a number of intermediate points which will lie on a straight line between the points PE$_1$ and PE$_2$. Consequently, the robot arm will be moved to the point PE$_2$; and whatever process function is associated with that point and sent with the second message will be executed.

As previously described, an alternative embodiment may be implemented by which the coordinate values defining the nonprogrammed points are transmitted by the external path generator to the robot control and executed immediately. Therefore, intermediate points between the nonprogrammed points are not created. In this situation, a data message representing a new set of input signals is received in an identical manner as previously described. However, there is no iteration counter; and therefore, process step 172 would not set an iteration counter. Further, after the message is received, if the good data flag is detected by process step 170 and no cancel message is detected by process step 174, the steps illustrated in FIG. 5b would not be required. With this embodiment, the process moves directly from step 174 of FIG. 5a to step 234 of FIG. 5c. The new set of input signals in the next coordinate store are transferred immediately to the present coordinate store. Process steps 176 and 178 are not required, and therefore, the process moves directly to process step 180 which transforms the rectangular coordinate values defined by the new set of input signals in the present coordinate store to corresponding generalized coordinate values. Therefore, referring to FIG. 4, using the alternative embodiment just described, if the third message sent by the external path generator represents a new set of input signals defining the position and orientation of the point PE$_3$, the robot control immediately transfers those coordinate values to the present coordinate store and produces a set of drive signals by transforming the rectangular coordinate values of the new set of input signals into corresponding generalized coordinate values. The set of drive signals causes the function element to move along a path from PE$_2$ to PE$_3$ without the requirement of defining intermediate points.

Assuming the same process is used to move the function element to the point PE$_4$, the complete nonprogrammed path will have been executed. Therefore, the external path generator sends a nondata message to the robot control which is detected by process step 246 of FIG. 5d as a cancel message. Process step 248 sets the cancel flag; and as previously described, the process moves through steps 204, 206 and 208 of FIG. 5d and 166, 168, 170 of FIG. 5a until process step 174 tests for the state of the cancel flag. Since the cancel flag is set, the process is terminated at the point 250 and returns to process step 124 of FIG. 3 which recalls the next programmed point and velocity. Thereafter operating in the standard automatic mode of operation, the function element is moved from the point PE$_4$ to the programmed point P$_1$ from which another cycle of operation may be initiated.

While the invention has been illustrated in some detail according to the preferred embodiments shown in the accompanying drawings, and while the preferred illustrated embodiments have been described in some detail, there is no intention to thus limit the invention to such detail. On the contrary, it is intended to cover all modifications, alterations and equivalents falling within the spirit and scope of the appended claims.

What is claimed is:

1. An apparatus for controlling the motion and operation of a function element associated with nonprogrammed positions during execution of a programmed cycle of operation defined by programmed positions and functions, the positions and functions described by sets of input signals representing respectively coordinates of positions relative to a first coordinate system and function codes, the apparatus being connected to an external path generator for producing further sets of input signals, the apparatus comprising;

(a) a machine having machine members connected to one end of the function element and actuators associated with the machine members for providing a plurality of axes of motion to move the function element, said plurality of axes of motion and the machine members defining a generalized coordinate system different from the first coordinate system; and (b) a machine control including a memory for storing programmed sets of input signals, a data communications interface for exchanging sets of input signals between the external path generator and the machine control, and a servo mechanism circuit connected to the actuators to control the position and motion of the function element, the control further including;

(1) means responsive to a function code signal recalled from the memory for receiving sets of input signals from the external path generator;

(2) means for producing drive signals in response to the input signals received from the external path generator, the drive signals representing coordinates of the nonprogrammed positions relative to the generalized coordinate system;

(3) means for applying the drive signal to the servo mechanism circuit to effect motion of a tool centerpoint associated with the function element to the nonprogrammed position; and (4) means responsive to input signals received from the external path generator for terminating the reception of input signals therefrom and for resuming the recalling of input signals from the memory.

2. The apparatus of claim 1 wherein the control further includes means responsive to function code signals for executing a process function subsequent to effecting motion of the tool centerpoint.

3. The apparatus of claim 1 wherein the first coordinate system is a rectangular coordinate system and the means for producing drive signals further comprises;
   (a) means for iteratively producing intermediate position signals representing rectangular coordinates of intermediate positions between the positions described by input signals; and
   (b) means for transforming the intermediate position coordinates to generalized coordinates.

4. The apparatus of claim 3 wherein the means for producing intermediate position signals further comprises;
   (a) means for computing incremental displacement magnitudes relative to each rectangular coordinate axis separating each intermediate position; and
   (b) means for adding the incremental magnitudes respectively to accumulated rectangular coordinate values for each iteration.

5. The apparatus of claim 3 wherein the means for receiving sets of input signals further comprises means for transmitting a set of coordinate input signals to the external path generator prior to receving input signals, the coordinate input signals representing the present position of the tool centerpoint.

6. The apparatus of claim 5 wherein the machine further comprises members having axes of rotation for controlling the orientation of the function element and the input signals further represent angular orientations of the function element.

* * * * *